US012564842B2

(12) United States Patent
Dreismann et al.

(10) Patent No.: US 12,564,842 B2
(45) Date of Patent: Mar. 3, 2026

(54) CROSS-FLOW SHREDDER FOR COMMINUTING MATERIAL

(71) Applicant: TERION AG, Buchs (CH)

(72) Inventors: Martin Dreismann, Mainbernheim (DE); Peter Merkel, Kitzingen (DE)

(73) Assignee: Terion AG, Buchs (CH)

( * ) Notice: Subject to any disclaimer, the term of this patent is extended or adjusted under 35 U.S.C. 154(b) by 284 days.

(21) Appl. No.: 18/271,359

(22) PCT Filed: Apr. 11, 2022

(86) PCT No.: PCT/EP2022/059602

§ 371 (c)(1),
(2) Date: Jul. 7, 2023

(87) PCT Pub. No.: WO2022/218909

PCT Pub. Date: Oct. 20, 2022

(65) Prior Publication Data

US 2024/0082850 A1 Mar. 14, 2024

(30) Foreign Application Priority Data

Apr. 12, 2021 (LU) ........................................ 102777

(51) Int. Cl.
*B02C 13/16* (2006.01)
*B02C 13/28* (2006.01)
(Continued)

(52) U.S. Cl.
CPC ............ *B02C 13/16* (2013.01); *B02C 13/288* (2013.01); *B02C 2013/2816* (2013.01); *B02C 2013/28609* (2013.01); *B02C 2013/28654* (2013.01)

(58) Field of Classification Search
CPC .......... B02C 2013/28654; B02C 13/16; B02C 13/288; B02C 13/2816; B02C 2013/28609; B02C 2013/28636; Y02W 30/62
See application file for complete search history.

(56) References Cited

U.S. PATENT DOCUMENTS 3,964,720 A * 6/1976 Mast ..................... B02C 13/286 241/101.6
2009/0218424 A1* 9/2009 Hauserman ........... B02C 13/286 241/29

FOREIGN PATENT DOCUMENTS

DE 3713477 C1 9/1988
DE 4300784 A1 7/1994
(Continued)

OTHER PUBLICATIONS

English translate (DE10045241A1), retrieved date Jun. 19, 2025.*

*Primary Examiner* — Mohammed S. Alawadi
(74) *Attorney, Agent, or Firm* — 24IP Law Group USA, PLLC; Timothy R DeWitt

(57) ABSTRACT

The present disclosure relates to a cross-flow shredder for grinding material with integrated dust-tight conveying means and air recirculation, and a method for grinding material using the cross-flow shredder according to the disclosure. An apparatus and a method for comminuting material to be ground are disclosed, the apparatus comprising a feed opening for material to be ground, a feed device, a cross-flow shredder, two screw conveyors for conveying the material to be ground and an intermediate dust-tight bunker, the two screw conveyors being connected in a dust-tight manner to the cross-flow shredder on the respective feed side and in a rod-tight manner to the intermediate bunker on the discharge side, the intermediate bunker being connected to the cross-flow shredder via a hose or pipe
(Continued)

system, and the intermediate bunker having a discharge opening closed by a slide valve.

16 Claims, 2 Drawing Sheets

(51) Int. Cl.
*B02C 13/286* (2006.01)
*B02C 13/288* (2006.01)

(56) References Cited

FOREIGN PATENT DOCUMENTS

| | | | | | |
|---|---|---|---|---|---|
| DE | 10045241 | A1 * | 4/2002 | ............... | B09B 3/00 |
| DE | 10062947 | A1 | 7/2002 | | |
| DE | 10228471 | A1 | 1/2004 | | |
| DE | 102017103844 | A1 | 8/2018 | | |
| WO | 2017/032363 | A1 | 3/2017 | | |

* cited by examiner

CROSS-FLOW SHREDDER FOR COMMINUTING MATERIAL

CROSS-REFERENCE TO RELATED APPLICATIONS

The present disclosure is a national stage application of International Application No. PCT/EP2022/059602, which claims priority to Luxembourg Patent Application No. LU102777 filed on Apr. 12, 2021. The aforementioned applications are incorporated herein by reference in their entirety.

BACKGROUND OF THE DISCLOSURE

Field of Disclosure

The present disclosure relates to a crossflow shredder for comminuting material with integrated dust-tight conveying means and air recirculation, as well as a method for comminuting material using the crossflow shredder according to the disclosure.

Brief Description of the Related Art

The recycling of materials is usually preceded by a separation of the materials into fractions of similar substances. For this purpose, the substances contained in a mixture are broken down so that they can then be separated.

In the prior art, devices are already described which are used for the comminution of materials. In the published German patent application with the file number DE 100 62 947 A1, a processing device is described which has a shredding device that breaks down the equipment to be recycled into its material components. Existing plastic foams are pulverized in the process, opening the pores. Gas or other volatile substances contained in the pores are thus released in the shredding device. A collecting device is connected to the comminution device, which removes and collects these released volatile substances. The comminuted material discharged by the comminution device is additionally transferred to an outgassing device in which it has sufficient time to further release volatile substances. In this outgassing device, the portion of the volatile substances can be separated from the solid material that was surface-bound. The collection device is also connected to the outgassing device following the comminution device and discharges the volatile substances.

Furthermore, from the published German patent application DE 43 00 784 A1, a method and a device for the comminution of appliances to be disposed of which have rigid foam or rigid plastics, in particular for the emission-free recovery of fluorocarbon from polyurethane foam insulation and other components, is known, in particular of refrigerators and refrigerators, wherein the rigid foam or the rigid plastics are comminuted together with the remaining appliance parts in a comminution device and wherein the comminution takes place in a room sealed off from the environment.

From the published German patent application DE 37 13 477 C1, a device for comminuting containers with highly combustible contents is known. The comminuting takes place in an airtight working chamber which is inerted by means of nitrogen. The containers are, for example, spray cans.

In the published German patent application DE 102 28 471 A1, a comminution device with a comminution chamber is disclosed, in which at least one blunt impact tool rotating in a lower region of the comminution chamber is arranged for carrying out a comminution process, with a drying device which is connected to the comminution chamber in order to draw off a gas stream from the comminution chamber, to dry it and to feed it back to the comminution chamber for drying the material to be ground. The comminution chamber can also be inerted.

Published International patent application WO 2017/032363 A1 relates to a unit for comminuting material by means of a cross-flow shredder, comprising a feed device for feeding material to be comminuted into the cross-flow shredder and at least one discharge device for discharging the comminuted material, wherein the unit is designed to be transportable or can be combined with means for transport, and the discharge device can be transferred from a position of use for operation of the cross-flow shredder into a position of non-use for transport of the unit, and from the position of non-use for transport of the unit into the position of use for operation of the cross-flow shredder.

The published German patent application DE 100 45 241 A1 discloses a method and a plant for processing waste (A) present as lump material, in particular waste containing a volatile component. Waste (A) is comminuted under vacuum by means of a device (4) arranged in an evacuable container (2), and the volatile component (K) released in the container (2) during comminution of the waste (A) is extracted and fed to a condensation unit (68). In this, at least part of the volatile component (K) is liquefied and collected for removal.

In the published German patent application DE 10 2017 103 844 A1, a device for processing materials is disclosed having a housing in which at least one shaft is rotatably mounted, to which at least one transverse element is attached, the shaft being arranged within a screen element, the base of the screen element being formed as a polygon.

SUMMARY OF THE INVENTION

The present disclosure provides an apparatus for comminuting material to be ground, comprising a feed opening for material to be comminuted, a feeding device, a cross-flow shredder, two screw conveyors for conveying the material to be comminuted and a dust-tight intermediate bunker, the two screw conveyors being connected in a dust-tight manner to the cross-flow shredder on the respective feed side and to the intermediate bunker in a dust-tight manner on the discharge side, the intermediate bunker being connected to the cross-flow shredder via a hose or pipe system, and the intermediate bunker having a discharge opening which can be closed by a projecting tip.

It is further provided that the discharge opening of the intermediate bunker is arranged in an area where the housing of the intermediate bunker has a lower height compared to the remaining part of the intermediate bunker.

In another aspect of the apparatus according to the disclosure, screens for separating comminuted material of desired particle size and/or shape are arranged at the outlet of the crossflow shredder.

In the apparatus according to the disclosure, the feed opening may be located above the crossflow shredder.

According to the disclosure, it is also provided that at least one conveying device is arranged between the feed opening and the crossflow shredder.

In a further embodiment of the apparatus, at least one conveyor is designed as a scraper chain or chain belt conveyor.

In a further aspect, the apparatus may comprise a control device for controlling the projecting tip depending on the level of material in the intermediate bunker.

In another embodiment, the apparatus comprises a screw conveyor arranged above the bottom of the intermediate bunker.

Further, the apparatus may comprise a device for determining the fill level of material in the intermediate bunker.

In another aspect according to the present disclosure, the device for determining the fill level of the material is connected to the control means for controlling the slider.

According to the disclosure, it is further provided that the apparatus is arranged in a frame surrounding the latter.

The present disclosure also relates to a method for comminuting ground material, comprising the steps of.

feeding the material to be comminuted into a feed opening;

transporting the material to be comminuted into a crossflow shredder;

transferring the comminuted material to an intermediate bunker (5) via at least two screw conveyors (4) connected in a dust-tight manner to the crossflow shredder (3) and intermediate bunker (5);

discharging the comminuted material from the intermediate bunker (5) via a discharge opening (26), a slider (25) at the discharge opening (26) being opened only when a previously defined filling level of the comminuted material in the intermediate bunker (5) is reached;

controlling the return of the air flow generated in the intermediate bunker (5) to the crossflow shredder (3) through a pipe or hose system (6) via the opening or closing of the slider (25) at the discharge opening of the intermediate bunker (5).

It is further provided that the recirculation and control of the air flow generated in the intermediate bunker into the cross-flow shredder is controlled via a closed slide valve at the discharge opening in the case of an empty intermediate bunker and is controlled via the material present in the intermediate bunker closing the discharge opening of the intermediate bunker in the case of an at least partially filled intermediate bunker. In this case, the slide valve at the discharge opening can be open to let material out of the intermediate bunker.

In a further embodiment, the method may comprise the step of feeding the material to be comminuted through a feed opening having three perimeter plates and transporting it into the crossflow shredder through a conveyor arranged between the feed opening and the crossflow shredder.

In another aspect of the disclosure, the method comprises the step of adjusting the desired particle size and/or shape via at least one screen arranged at the outlet of the crossflow shredder.

Further, the method may include the step of additionally controlling the recirculation and control of the airflow generated in the crossflow shredder by the amount of material fed into the feed opening.

Other aspects, features and advantages of the present disclosure are readily apparent to those skilled in the art from the following detailed description, as preferred embodiments and implementations are described for illustrative purposes. The present disclosure may also be embodied in other, different embodiments and described details may be modified in various obvious aspects, all without departing from the teachings and scope of the present disclosure. Accordingly, the drawings and descriptions are intended to be illustrative and not limiting.

BRIEF DESCRIPTION OF THE FIGURES

The disclosure is described with reference to figures. It is understood that the embodiments and aspects of the disclosure described in the figures are examples only and in no way limit the scope of protection of the claims. The disclosure is defined by the claims and their description. It is understood that features of one aspect or embodiment of the disclosure may be combined with a feature of another aspect or aspects of other embodiments of the disclosure, it shows:

DETAILED DESCRIPTION OF THE INVENTION

Figure 1:
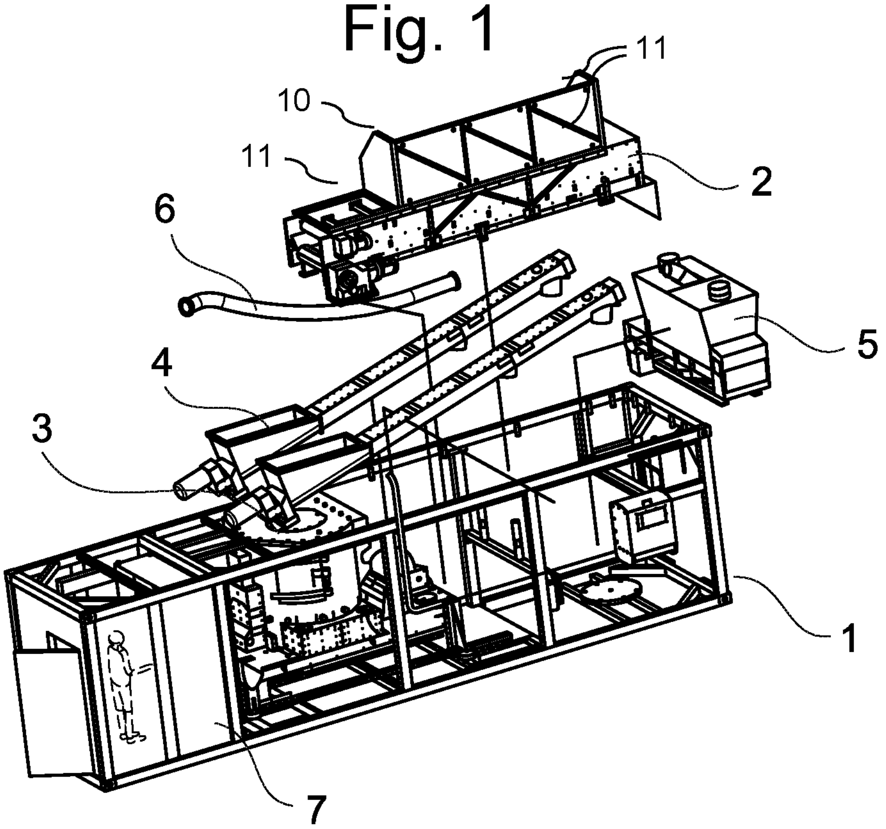
FIG. 1 is a perspective view of a crossflow shredder according to the present disclosure.

The technical problem is solved by the independent claims. The dependent claims deal with further specific embodiments of the disclosure.

The present disclosure relates to a cross-flow shredder which, together with other conveying equipment and a buffer container, is arranged in a frame, as known from freight transport, and whose air recirculation system controls the strong air flows generated by the rotation of the chains in the shredder, keeps them in the system, and thus enables largely dust-free operation, which is considered advantageous.

Furthermore, the crossflow shredder according to the present disclosure has screw conveyors as discharge, preferably two screw conveyors, and does not use conveyor belts. Both screw conveyors are dust-tightly connected to the crossflow shredder on the infeed side and to the intermediate bunker on the discharge side. The intermediate bunker, in turn, is also designed to be dust-tight and is equipped with a closing gate at the discharge, which can be a mechanically, electrically, hydraulically or manually closable closing gate. A hose or pipe system connects the intermediate bunker with the crossflow shredder, thus allowing the air flow to be returned to the crossflow shredder. The hose and pipe system is designed to ensure air circulation.

Due to the operating principle of the comminuting tools, the crossflow shredder draws in up to 6,000 $Nm^3$ of air through the material inlet opening. This air is accelerated in the shredder and is present in the area of the wall as a laminar air flow; in the rest of the reaction vessel, the flow is chaotic. In previous designs, this air flow is discharged together with the material through the screens onto a transport system with all the associated undesirable effects such as dust generation or release and contamination by light material components swirling around.

To avoid this effect, in a device according to the present disclosure, the air flow is directed through the screens into the area of the screw conveyors not occupied by material and only then further into the intermediate bunker, where the air flow relaxes due to the larger volume of space.

In order to prevent a static pressure from building up in the system consisting of the cross-flow shredder, conveying equipment (screw conveyor) and intermediate bunker, which prevents a material flow of fines, the intermediate bunker is connected to the cross-flow shredder via a hose or pipe system in such a way that the latter preferably receives the required air from this hose or pipe system.

The air in the crossflow shredder is forced into the screw conveyors through perforated screens located in its wall. The air must flow into the intermediate bunker following the guidance of the screws and, without recirculation, would build up to a counterpressure. This back pressure results in static pressure when equilibrium is reached between air pressure from the crossflow shredder and air pressure in the intermediate bunker. This counterpressure must be prevented by allowing the air that builds up in the intermediate bunker to escape via the pipe or hose system. This path is simplified by sucking in the air.

The recirculated air volume is controlled by the speed of the shredding tools, e.g., chains. The laminar air flow against the wall creates a suction that increases in proportion to the flow velocity and thus sucks in the air located in the pipe or hose system. This also draws in the air from the intermediate bunker, thus avoiding the static pressure described above. The faster the shredding tools rotate, the faster the air flow and consequently the stronger the suction from the pipe or hose system.

Circulating air—i.e., air from outside—is always drawn in, whereby the proportion of air from the intermediate bunker can be varied. However, if the material feed into the crossflow shredder is blocked with material, the air is only drawn from the intermediate bunker, at least for the time of the blockage. However, such a blockage can also be brought about specifically by controlling the feeding of the system accordingly. According to the disclosure, valves can also be provided to control the air supply in the intermediate bunker or to control where the air supply in the intermediate bunker comes from.

In this system, the dust-tight screw conveyors downstream of the crossflow shredder and the intermediate bunker, which is also dust-tight, together with the recirculation of the air into the crossflow shredder from the intermediate bunker through the hose and pipe system have a number of positive effects. On the one hand, the crossflow shredder draws in considerably less air through the feed opening during operation; on the other hand, the steady air flow supports the material discharge and has a throughput-increasing effect, especially with light materials. Furthermore, static pressure can no longer build up in the system, which would then cause the crossflow shredder to release its air through the material entry opening, which would counteract the material input.

The most important effect, however, is that the crossflow shredder can be operated almost dust-free due to the existing air recirculation. The arrangement of the hose and pipe system between the intermediate bunker and the crossflow shredder in accordance with the disclosure, in conjunction with the dust-tight connections and elements, are alone sufficient to achieve the positive effects mentioned above.

FIG. 1 shows an embodiment of a Crossflow shredder according to the present disclosure, which is arranged in a frame 1 of a transport container. At one end of the frame there is a separate control space 7, which may be in the form of an area and which is provided for operating, setting up the electrotechnical installations and controlling the Crossflow shredder. This control space 7 can, but need not, be designed as a closed and air-conditioned dust-free space by means of partition walls. In another embodiment, the control room 7 can also be open.

Furthermore, FIG. 1 shows an element for feeding the ground material via an integrated conveyor device 2. The conveyor device 2 can be designed as a scraper chain conveyor. The feed opening 10 is arranged above the conveyor device 2 and, in the embodiment shown in FIG. 1, is surrounded on three sides by border plates 11 to ensure safe filling with material. These border plates 11 can be installed in such a way that filling of the scraper floor can optionally take place from the right or the left frame side. The conveyor 2 (scraper chain conveyor) feeds the material into the crossflow shredder 3, which crushes it. Through screens (not shown), which at the same time define the grain size and shape, the material is fed into the discharge screws 4, which in turn convey it to the intermediate bunker 5. Between the intermediate bunker 5 and the crossflow shredder 3 is a hose or also pipe 6, which returns the air flow generated by the crossflow shredder 3 back into the crossflow shredder 3.

The intermediate bunker 5 has a slide valve (not shown) on the discharge side, which is not opened until the discharge or the area around the discharge opening of the intermediate bunker has been sealed by the material introduced, so as to prevent the fine fraction of the ground material from being discharged in an uncontrolled manner into the working space around the system. Only when the discharge opening of the intermediate bunker has been sufficiently sealed, the material is discharged from the system by opening the discharge opening. For this purpose, the slide valve which closes the discharge opening is opened or displaced. The intermediate bunker 5 can be rotatably mounted and can optionally discharge the crushed material to the right or left side of the frame in which it is arranged.

Figure 2:
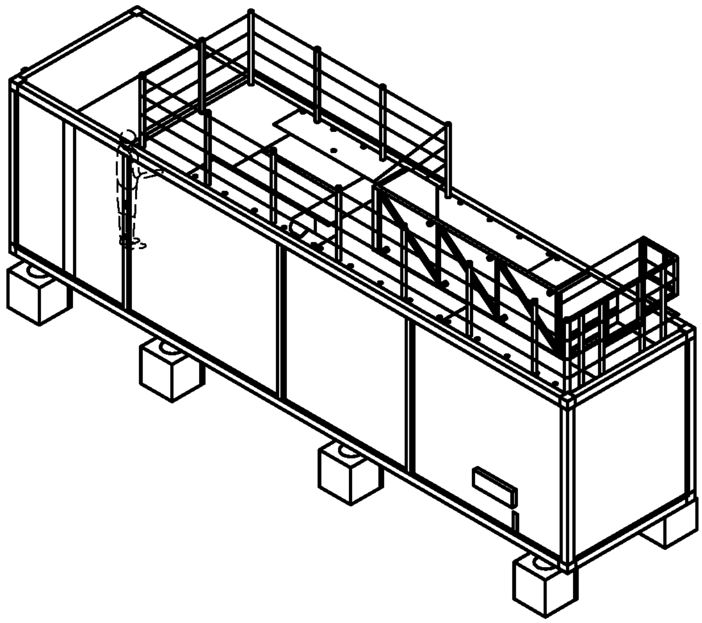
FIG. 2 a perspective view in one embodiment as a shipping container with surrounding walls.

FIG. 2 shows the crossflow shredder according to FIG. 1, where it is completely surrounded by walls and has the dimensions of a transport container. This allows the crossflow shredder to be moved to a job site on trucks or other common transport systems.

Figure 3:
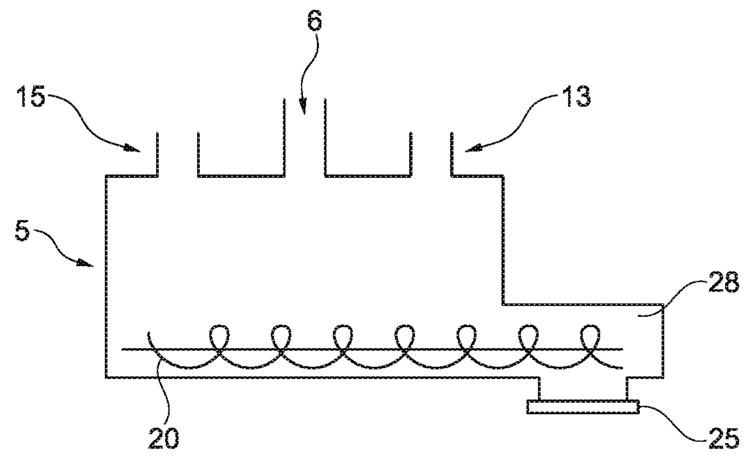
FIG. 3 shows an empty intermediate bunker in accordance with the present disclosure.

FIG. 3 shows an empty intermediate bunker 5 with a first entry 13 of the first screw conveyor, which comes from the crossflow shredder, and a second entry 15 of a second screw conveyor, which also comes from the crossflow shredder. In the lower part of the intermediate bunker there is a screw conveyor 20 which conveys material towards a projecting tip 28 of the intermediate bunker 5, the projecting tip 28 having a discharge opening 26 on its underside which is closed by a slider 25 in FIG. 4. No air can escape from the intermediate bunker 5 through the closed slider 25 and is thus returned to the crossflow shredder (not shown) through the hose or pipe system 6.

The part of the intermediate bunker 5 designated as the projecting tip 28 is characterized by the fact that this part has a lower height of the housing 27 or a lower volume compared to the remaining volume of the intermediate bunker 5. This has the technical effect that already smaller amounts of material 30 are sufficient to close the discharge opening 26, which is considered advantageous with regard to the control of the recirculation of the air flow from the crossflow shredder through the hose or pipe system.

Figure 4:
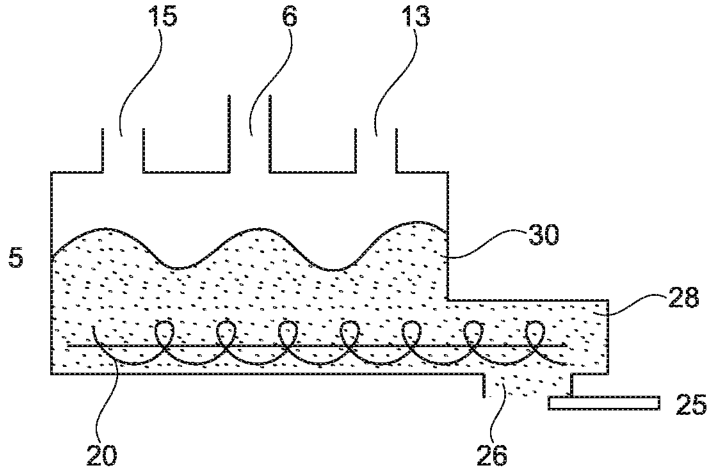
FIG. 4 shows an intermediate bunker according to the present disclosure filled with material.

FIG. 4 shows an intermediate bunker 5, as also shown in FIG. 4, wherein the intermediate bunker 5 is filled with material 30. Once the material reaches a previously defined height in the intermediate bunker 5, the slider 25 can be opened to discharge the material 30 through the discharge opening 26. The material 30 located in the projecting tip 28 prevents air from escaping from the intermediate bunker 5 through the discharge opening 26. As soon as the level of the material 30 falls below the previously defined level, the slider 25 is closed again to prevent air from escaping through the discharge opening 26.

These measures according to the disclosure also prevent the uncontrolled escape of material due to the air flow. Thus, dust-free operation is based on the use of dust-tight screw conveyors and a dust-tight intermediate bunker. Furthermore, freedom from dust is based on the use of the hose or pipe system for air return to the cross-flow shredder and the shape of the intermediate bunker with the beak in the area of the discharge opening as well as the control of the discharge opening of the intermediate bunker depending on the filling level of the intermediate bunker with material.

The advantages of the present disclosure can be summarized as follows:

mobile crossflow shredder in the format of usual transport containers.

Use of dust-tight integrated transport systems for the internal transport of the material to be ground to reduce/avoid dust generation in the working area around the system.

Use of a dust-tight sealable intermediate bunker to prevent the uncontrolled escape of dust.

Use of an air recirculation system to control the air flow.

Use of a worm drive to discharge the ground material, avoiding bulk operations in the unit.

The foregoing description of the preferred embodiment of the disclosure has been presented for purposes of illustration and description. It is not intended to be exhaustive or to limit the disclosure to the exact form disclosed, and modifications and variations are possible in light of the above teachings or may be acquired from practice of the disclosure. The embodiment has been chosen and described to explain the principles of the disclosure and its practical application, so that those skilled in the art may utilize the disclosure in various embodiments as may be appropriate to the particular use. It is intended that the scope of the disclosure be defined by the appended claims.

REFERENCE SIGN

1 Frame
2 Material task
3 Crossflow shredder
4 Screw conveyor
5 Intermediate bunker
6 Hose or pipe system
7 Control room
10 Task opening
11 Perimeter plates
13 Entry first screw conveyor
15 Entry second screw conveyor
20 Screw conveyor intermediate bunker
25 Slider intermediate bunker
26 Discharge opening intermediate bunker
28 Projecting tip intermediate bunker
30 Material

What is claimed is:

1. An apparatus for comminuting material, comprising: a feed opening for material to be comminuted, a feed device, a cross-flow shredder, two screw conveyors for conveying the material to be comminuted and a dust-tight intermediate bunker wherein the two screw conveyors are connected in a dust-tight manner to the cross-flow shredder on a respective feed side and in a rod-tight manner to the intermediate bunker on a discharge side, wherein the intermediate bunker is connected to the cross-flow shredder via a hose or pipe system, and the intermediate bunker has a discharge opening, the discharge opening is configured to be closed by a projecting tip.

2. The apparatus according to claim 1, wherein the discharge opening of the intermediate bunker is arranged in an area where a housing of the intermediate bunker has a lower height compared to a remaining part of the intermediate bunker.

3. The apparatus according to claim 1, wherein screens for separating comminuted material of desired particle size and/or shape are arranged at an outlet of the cross-flow shredder.

4. The apparatus according to claim 1, wherein the feed opening is arranged above the cross-flow shredder.

5. The apparatus of claim 4, wherein at least one conveyor is disposed between the feed opening and the cross-flow shredder.

6. The apparatus of claim 5, wherein the at least one conveyor is a scraper chain or chain belt conveyor.

7. The apparatus according to claim 1, wherein the apparatus further comprises a control device for controlling the projecting tip depending on a filling level of the intermediate bunker with comminuted material.

8. The apparatus according to claim 1, wherein the apparatus further comprises a screw conveyor arranged above a bottom of the intermediate bunker.

9. The apparatus according to claim 1, wherein the apparatus further comprises a device for determining a fill level of the material to be discharged in the intermediate bunker.

10. The apparatus of claim 9, wherein the device for determining the fill level of the material is connected to a control means for controlling a slider closing the discharge opening.

11. The apparatus according to claim 1, wherein the apparatus further comprises a frame which is configured to surround the apparatus.

12. A method for comminuting material comprising the steps of:

feeding a material to be comminuted into a feed opening;

transporting material to be comminuted into a cross-flow shredder;

transferring comminuted material to an intermediate bunker via at least two screw conveyors connected in a dust-tight manner to the cross-flow shredder and the intermediate bunker;

discharging the comminuted material from the intermediate bunker via a discharge opening, a slider at the discharge opening being opened only when a previously defined filling level of the comminuted material in the intermediate bunker is reached;

controlling a return of an air flow generated in the intermediate bunker to the cross-flow shredder through a pipe or hose system via an opening or closing of the slider at the discharge opening of the intermediate bunker.

13. The method according to claim 12, wherein the material to be comminuted is fed through the feed opening, the feed opening has three border plates, and the material to be comminuted is transported into the cross-flow shredder by a conveying device arranged between the feed opening and the cross-flow shredder.

14. The method according to claim 12, wherein a desired particle size and/or shape is set via at least one screen arranged at an outlet of the cross-flow shredder.

15. The method according to claim 12, wherein the return of the air flow generated in the intermediate bunker into the cross-flow shredder when the intermediate bunker is empty is controlled via the slider at the discharge opening of the intermediate bunker.

16. The method according to claim 12, wherein the return of the air flow generated in the intermediate bunker into the cross-flow shredder when the intermediate bunker is at least partially filled is controlled via the comminuted material present in the intermediate bunker, wherein the comminuted material closes the discharge opening of the intermediate bunker.

* * * * *